United States Patent Office 2,718,270
Patented Sept. 20, 1955

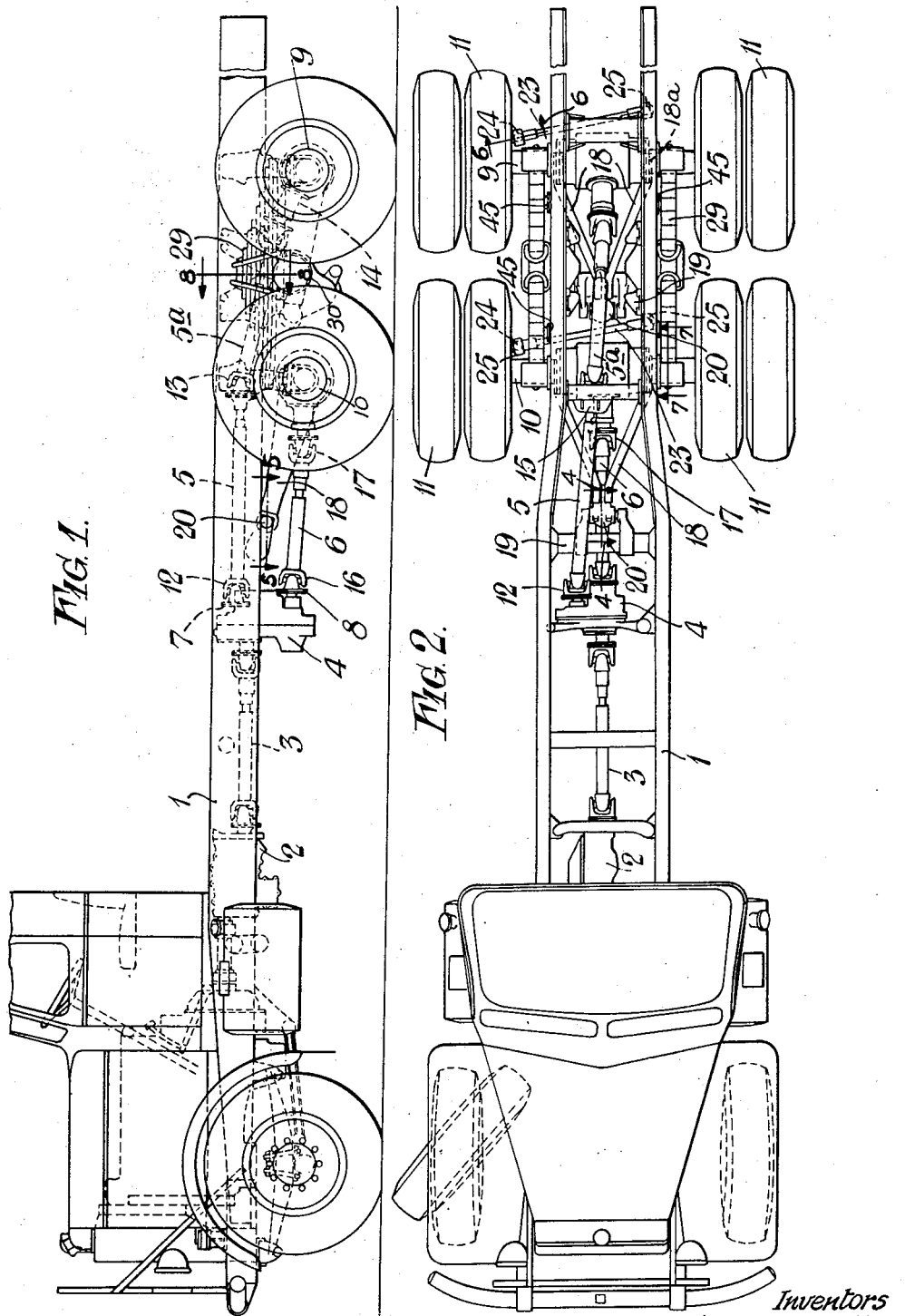

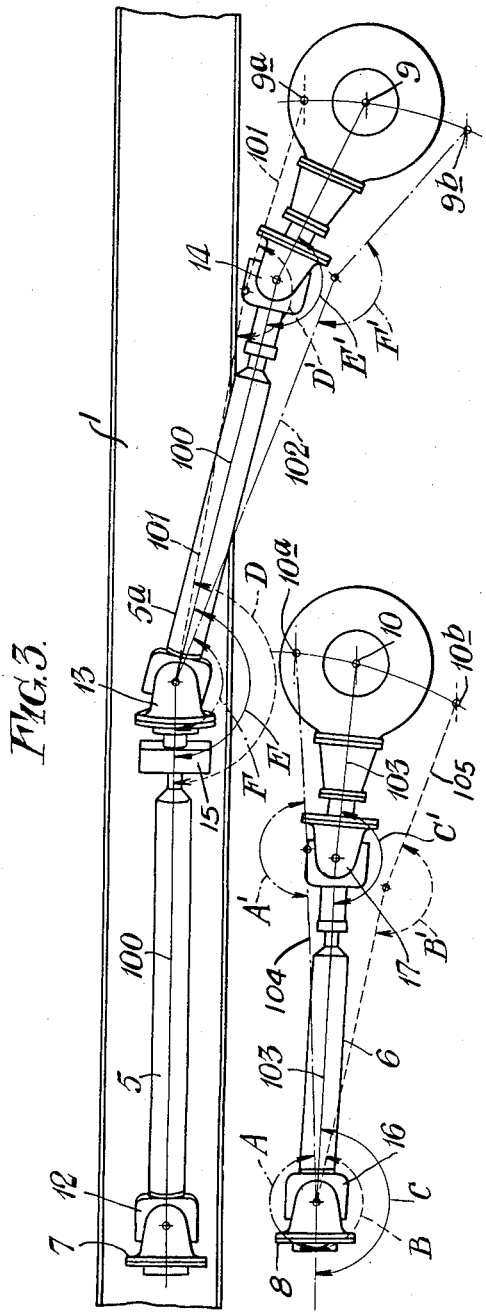

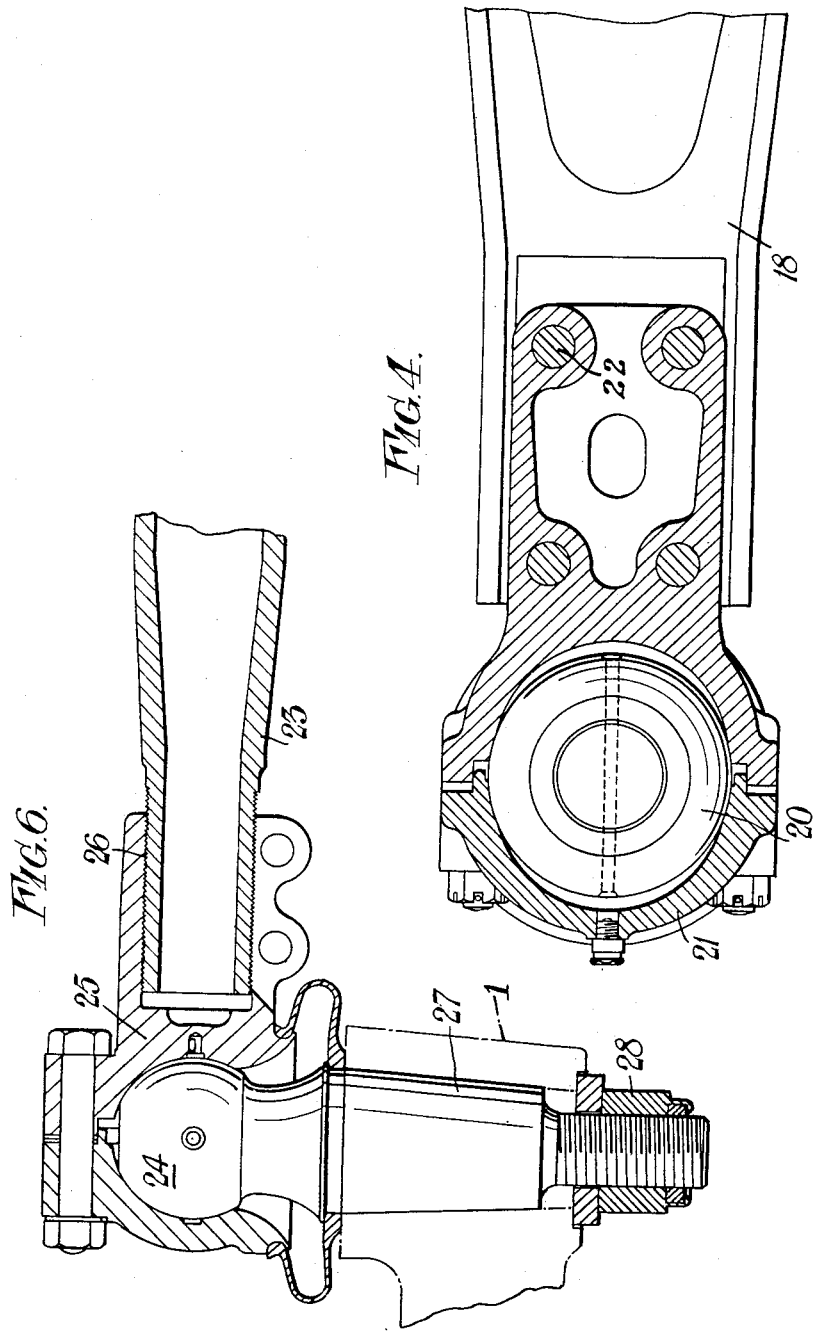

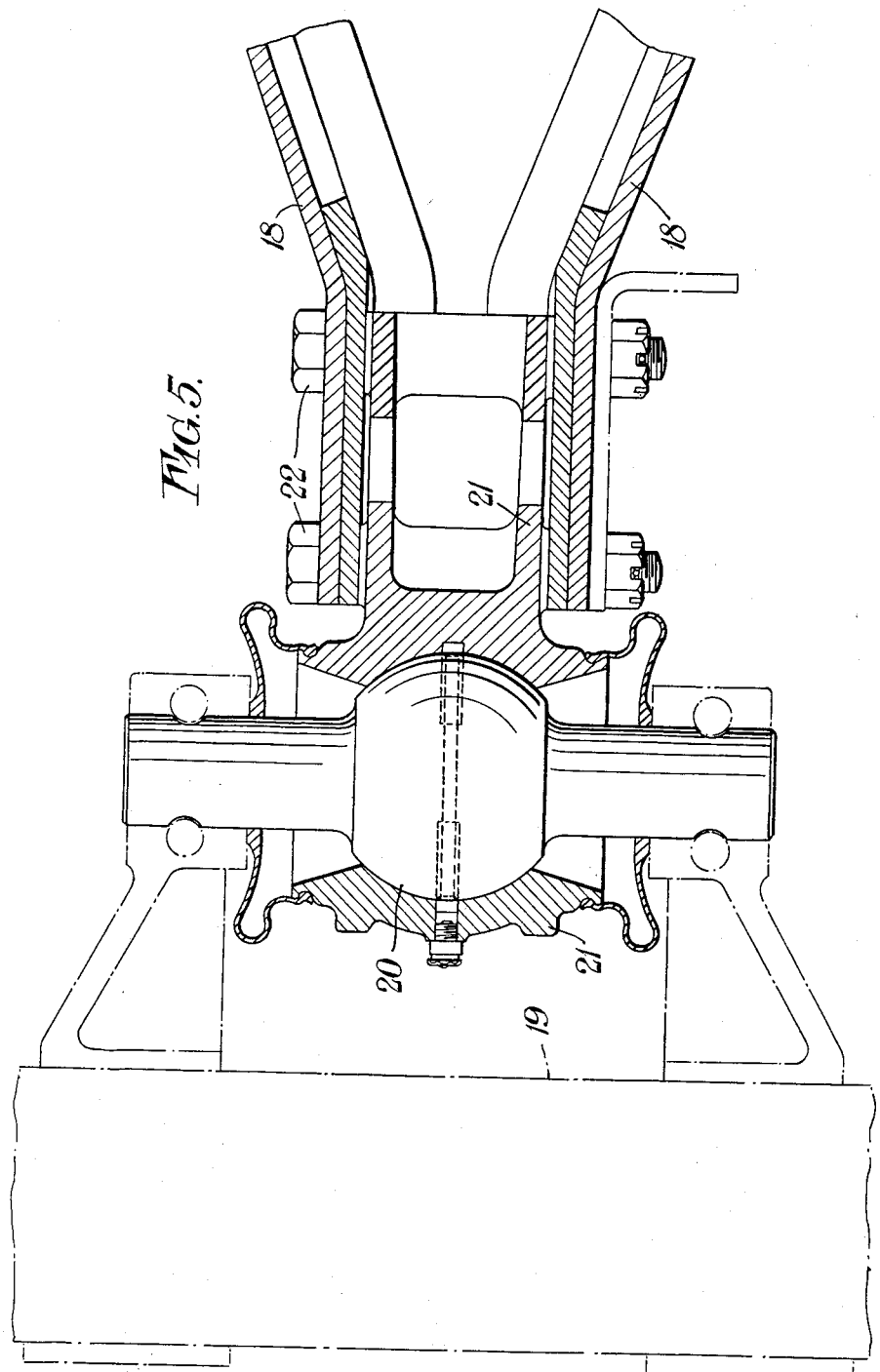

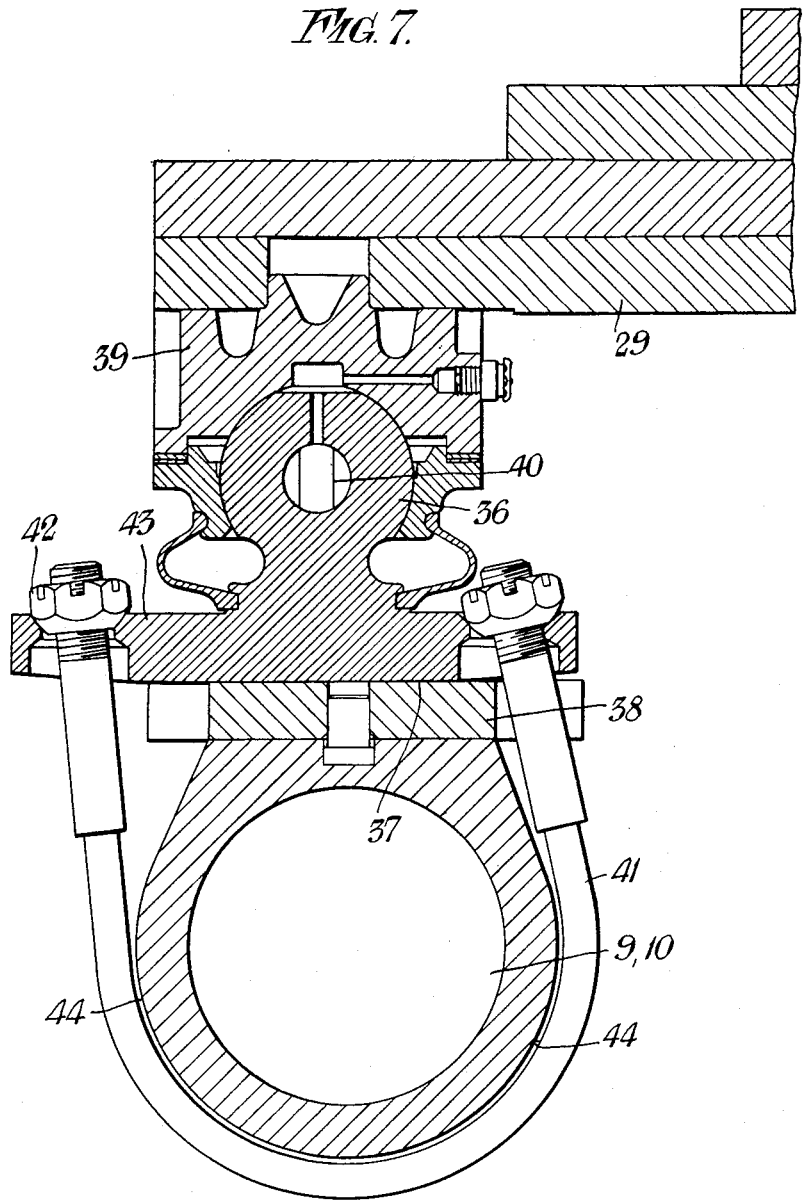

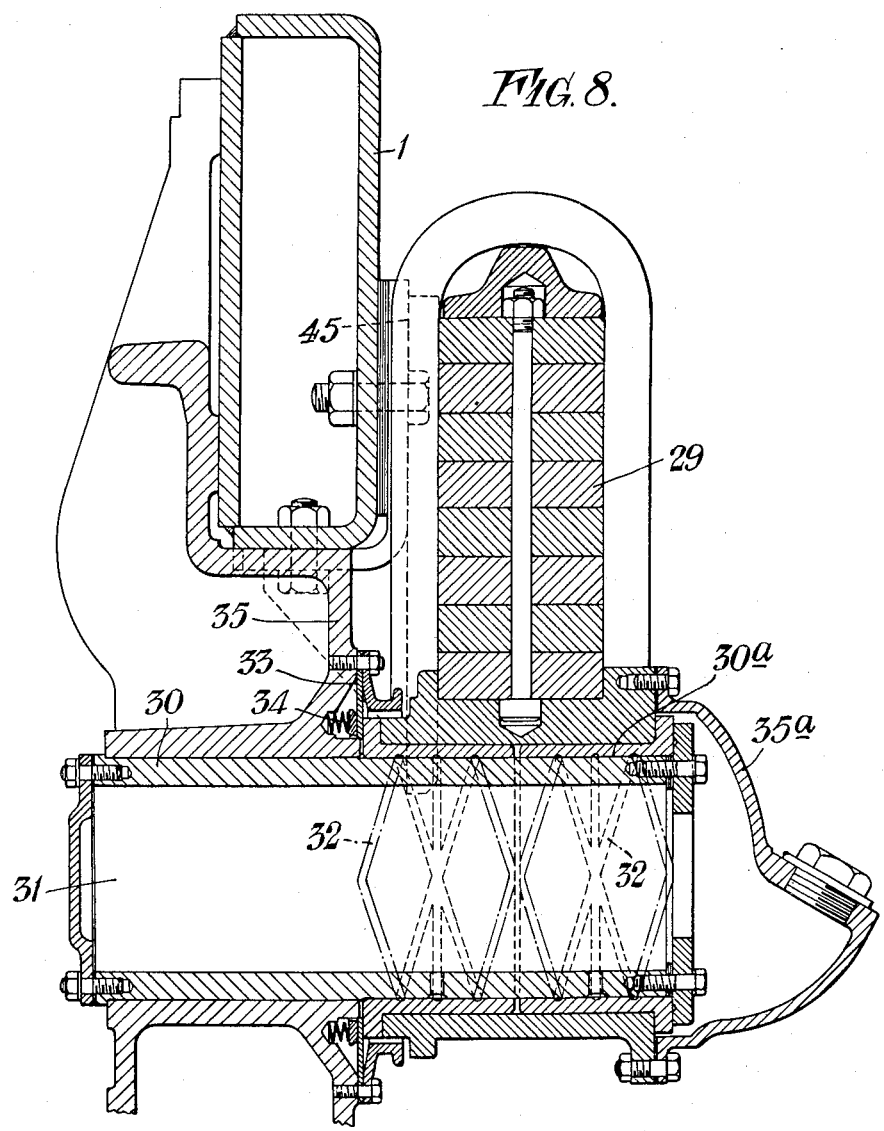

2,718,270

TANDEM AXLE ARTICULATED DRIVESHAFTS HAVING UNIFORM VELOCITY RATIO

Laurence Derek Watts, Chorleywood, and Maurice George Hibberd Walter, Ruislip, England, assignors to Scammell Lorries Limited, Watford West, England, a British company Application September 17, 1951, Serial No. 246,894

Claims priority, application Great Britain September 20, 1950

1 Claim. (Cl. 180—22)

The invention relates to improvements in and relating to multiple drives for motor road vehicles of the kind having driven axles in tandem, that is to say with driven axles one behind the other.

One feature of the invention is the lay-out of the two propeller shafts and co-operating torque members so that a practical uniform velocity ratio is maintained irrespective of up and down wheel articulation.

Thus according to the invention each axle is driven by a propeller shaft from a transposing or gear box and is characterised in that torque members for fore and aft location of the axles, are mounted between the axles casings and the chassis frame, the torque members being pivotally mounted to parts of the said frame, the geometrical positioning of the pivotal mountings of the torque members, being in such relationship to the axes of the propeller shafts that the universal joint angles on each shaft remain substantially equal at all times irrespective of up and down movements of the driven axles, thereby giving a practical uniform velocity ratio.

Fore and aft location of the axles, in a preferred form, is by way of triangulated torque arms bolted to the axle casings. The front ends of the said arms are attached to frame cross members, by ball mountings.

Means may be provided for allowing large angles of cross or transverse articulation. This is effected by a floating type bearing, such as a floating ball type of slipper bearing, on either end of the suspension spring, so that with large angles of cross articulation, the spring itself is not subjected to twist, or not to any substantial twist. Means are provided, such as radius or panhead rods to relieve the springs of side loads.

With a vehicle incorporating the present invention the springs are relieved of practically all torque reactions and side loads, so that the springs have one function, namely, suspension of the vehicle.

Further that load transference from one axle to the other during driving, accelerating or braking is for all practical purposes avoided.

The accompanying drawings illustrate an example of the carrying into effect of the invention.

In the drawings:

Fig. 1 is a side elevation of a chassis having two driven axles in tandem.

Fig. 2 a plan thereof.

Fig. 3 is a diagrammatic elevational view.

Fig. 4 is a sectional side elevation on the line 4—4 of Fig. 2 and Fig. 5 is a sectional plan view on the line 5—5 of Fig. 1, of the torque arm ball joint assembly.

Fig. 6 is a part sectional view of the radius or panhead rod assembly taken on the line 6—6 of Fig. 2.

Fig. 7 is a sectional view taken on the line 7—7 of Fig. 2 showing the spring to axle mounting of the double drive.

Fig. 8 is a sectional elevational view on the line 8—8 of Figs. 1 and 9.

Figure 9:
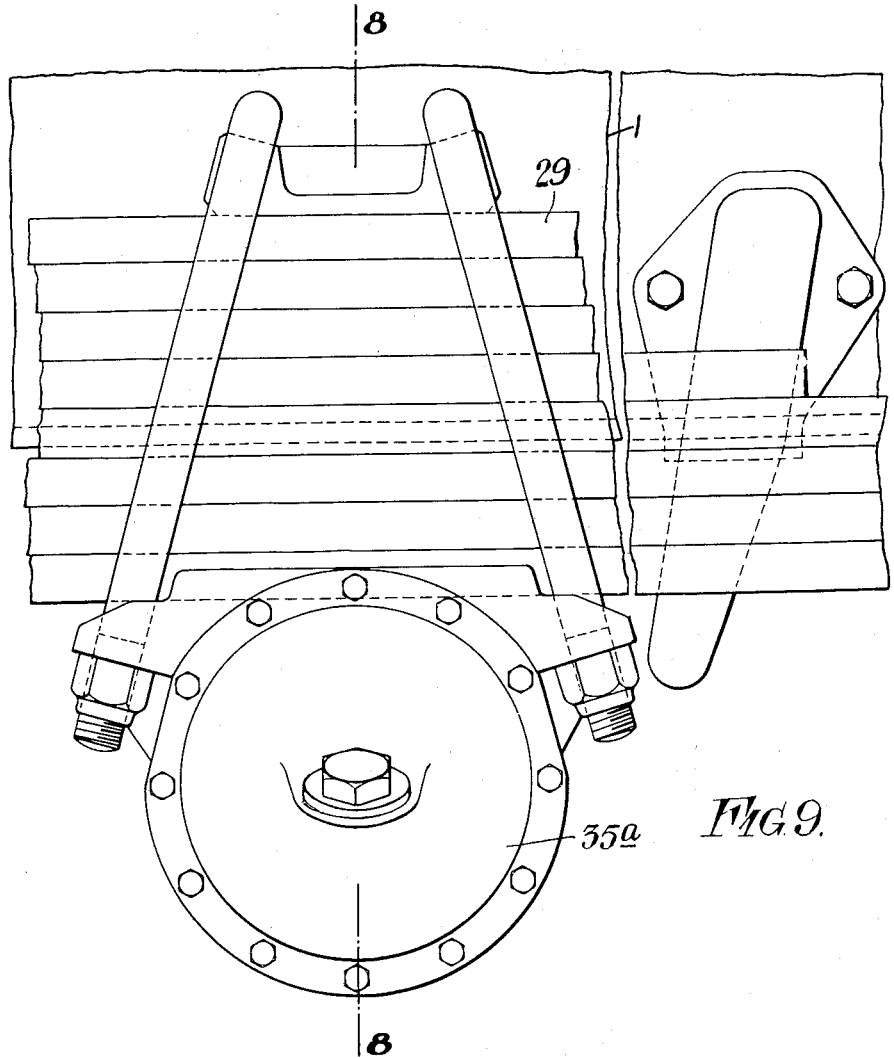
Fig. 9 is a side view of the mounting for the road springs.

Referring to Figs. 1 and 2 on the chassis 1 is the usual gear box 2 and a shaft 3. This shaft 3 conveys power from the gear box 2 to a transposing gear box 4. This latter gear box 4 is adapted to distribute power to two propeller shafts 5, 5a and 6 the connexions of the said shafts to the shafts in the transposing box 4 being by way of flanges 7 and 8. The gear lay-out in the box 4 is such as to provide, for example, a two speed ratio by means of toothed gears, somewhat comparable to an ordinary gear box device.

The propeller shaft 5, 5a, the latter being inclined to the former, drives the rear axle 9, and the propeller shaft 6 drives the front axle 10 of the bogie. The axles 9 and 10 have twin tire wheels 11. The axles which are of the known solid beam type are driven by bevel gears.

It will be seen that the propeller shaft for the rear axle is made in two parts 5, 5a with universal joints 12, 13 and 14.

A bearing housing 15 carried on the frame is provided for the meeting ends of the two parts.

The propeller shaft 6 has universal joints 16 and 17.

Torque arms 18, of triangular shape, serve to locate the two axles 9 and 10 of the bogie in the fore and aft direction. These torque arms are bolted at 18a (see Fig. 2) to the axle casings, the bolts not being shown, and have their front ends turning on ball pivot mountings 20. The pivot mountings 20 are housed in casings 21 to which the said front ends are bolted at 22 (see Figs. 4 and 5). The front ends are attached to frame cross members 19 by these ball mountings.

The load is transferred between the main frame 1 and the axles by semi-elliptic springs 29. These springs turn about central pivot 30 (see Fig. 8) and have their outer ends mounted on the axles 9 and 10. The pivot bearings 30a are lubricated by an oil sump 31 through channels 32. Oil seals 33 which are spring loaded at 34 are provided. Mounting brackets 35 and end plates 35a are provided for the pivot bearings 30.

As shown means are provided for allowing large angles of cross or transverse articulation. With this end in view a floating ball type of slipper is employed on either end of the suspension spring so that with large angles of cross articulation, the spring itself is not subjected to any substantial twist (see Fig. 7). In this connexion the ends of the springs 29 are attached to the axles by floating ball slippers 36, the flat underfaces 37 of which slide on replaceable wearing plates 38 on the axle cases. The upper ends of the ball slippers mate with cups 39 attached to the ends of the springs 29. The slippers are located by pins 40 passing through the ball into grooves in the ball cups and are restrained from leaving the axles on spring rebound by check straps 41 which pass around under the axle casings, the ends of the straps being secured by nuts 42 to extensions 43. It will be seen that a clearance 44 is provided between the axle casing and the strap 41.

As shown in Fig. 2 rubbing pads 45 are fitted to the chassis side members to act as stops for the spring. Although the slippers at the ends of the springs are ball mounted to the spring there is a small resolved sideways component on the springs on cross articulation. To prevent this side load on the ends of the spring from overloading the spring mounting bearings and barrelling them, these wearing or rubbing pads are provided. A small clearance is allowed between the pads and the springs so that when the side load is applied the springs can only move a small amount before the rubbing pads come into action and prevent further movement.

Lateral location of the axles 9 and 10 is by means of panhard type radius rods 23 attached by ball ends or pivots 24 to the casings of the axles 9 and 10 on one side (the off side looking at Fig. 2) and to the frame cross members on the other side (the near side) looking at Fig. 2.

As shown in Fig. 6 these panhard type radius rods 23 work on ball pivots 24, the latter being in housings 25, to which the rods 23 are joined by screw connexions 26. The ball pivots 24 have extension spindles 27 which respectively pass through the axle casings and the frame cross members and are held in position by nuts 28.

Toggle brakes of known type may be fitted operated by air servo cylinders mounted on the forward end of the torque arms and operating short cross shafts from which hanging levers operate the toggle levers on the axles. These cross shafts are preferably mounted close to the torque arm pivots so that relatively little movement takes place between the brake connexions on the frame and the axle. A hand brake control may be provided which is connected to a separate lever or arm on the cross shaft. The braking systems form no part of the present invention.

Fig. 3 illustrates that feature of the invention in which the lay-out of the propeller shafts and the co-operating torque members are so arranged and inter-related that at all the up and down movements of the axles the angles remain substantially equal. The full line 100 denotes the position of the axis of the propeller shaft 5, 5a on a level surface. The dotted line 101 denotes the position of the axis of the part 5a when the centre of the back axle 9 has moved up to the position 9a, and the dot and dash line 102 the position of the axis of the part 5a when the axle centre 9 has moved down to the position 9b. It will be noted that the angles D, E, and F, and D', E' and F' remain substantially equal at all degrees of articulation.

As regards the front axle 10, the full line 103 denotes the position of the axis of the propeller shaft on a level surface. The dot and dash line 104 denotes the position when the centre of the front axle has moved up to 10a and the dotted line 105 the position when the centre of the axle has moved down to 10b. Here again it will be noted that the angles A, B, and C, and A', B' and C' remain substantially equal at all degrees of articulation. In practice as is shown by the angle B, small variations can be tolerated without unduly affecting the object of the invention.

It will be apparent that the invention can be variously modified and changed within the scope of the appended claim.

We claim:

A motor road vehicle comprising a chassis frame, an engine, a gear box, a transposing gear box, means for driving the transposing gear box from the first gear box, a pair of spaced rear axle assemblies arranged in tandem and mounted free of one another, axle casings enclosing the said axle assemblies, suspension springs between the frame and the axles, a floating ball slipper bearing on the ends of each suspension spring for attaching the springs to the axle casings said bearings preventing the springs from being subjected to any substantial twist, the intermediate ends of said springs being attached to the chassis frame, panhard type radius rods for lateral location of said axles, said radius rods having their one ends attached to the axle casings and their other ends to the chassis frame, separate propeller shafts for driving each axle independently from said transposing gear box, the latter being located forward of both the axle assemblies, the propeller shaft for the rear axle being in two parts, universal joints fitted to each end of the propeller shaft for the front axle, universal joints fitted to the outer ends of the two parts of the propeller shaft for the rear axle, an intermediate universal joint between the meeting ends of the said two parts, torque members for fore and aft locating of the axle assemblies, one torque member being allotted to each axle assembly, means for securing the back end of each torque member to the axle casing of the appropriate axle assembly, a pivotal mounting on the chassis frame for the front end of each of the torque members, one pivotal mounting being attached to the chassis frame substantially midway between the axes of the universal joints of the propeller shaft for the front axle assembly and the other pivotal mounting being attached to the chassis frame substantially midway between the axes of the intermediate universal joint and the universal joint adjacent to the rear axle assembly, whereby the angles of the universal joints remain substantially equal at all times irrespective of the up and down movement of the axles.

References Cited in the file of this patent

UNITED STATES PATENTS

| | | |
|---|---|---|
| 1,533,518 | Schlack | Apr. 14, 1925 |
| 1,623,845 | Kogstrom | Apr. 5, 1927 |
| 1,839,577 | Moreland | Jan. 5, 1932 |
| 1,847,348 | Marcum | Mar. 1, 1932 |
| 1,899,240 | Marcum | Feb. 28, 1933 |
| 1,946,060 | Buckendale | Feb. 6, 1934 |
| 1,967,027 | Hebner | July 17, 1934 |
| 2,139,937 | Collender | Dec. 13, 1938 |
| 2,168,970 | Buckendale | Aug. 8, 1939 |
| 2,200,658 | Singleton | May 14, 1940 |
| 2,204,987 | Konetsky | June 11, 1940 |
| 2,356,180 | Roos | Aug. 22, 1944 |
| 2,356,375 | Brantingham | Aug. 22, 1944 |
| 2,599,469 | Merry | June 3, 1952 |
| 2,607,431 | Buckendale | Aug. 19, 1952 |
| 2,624,593 | Stover | Jan. 6, 1953 |

FOREIGN PATENTS

| | | |
|---|---|---|
| 8,911/27 | Australia | Aug. 18, 1927 |